United States Patent Office 3,443,547
Patented May 13, 1969

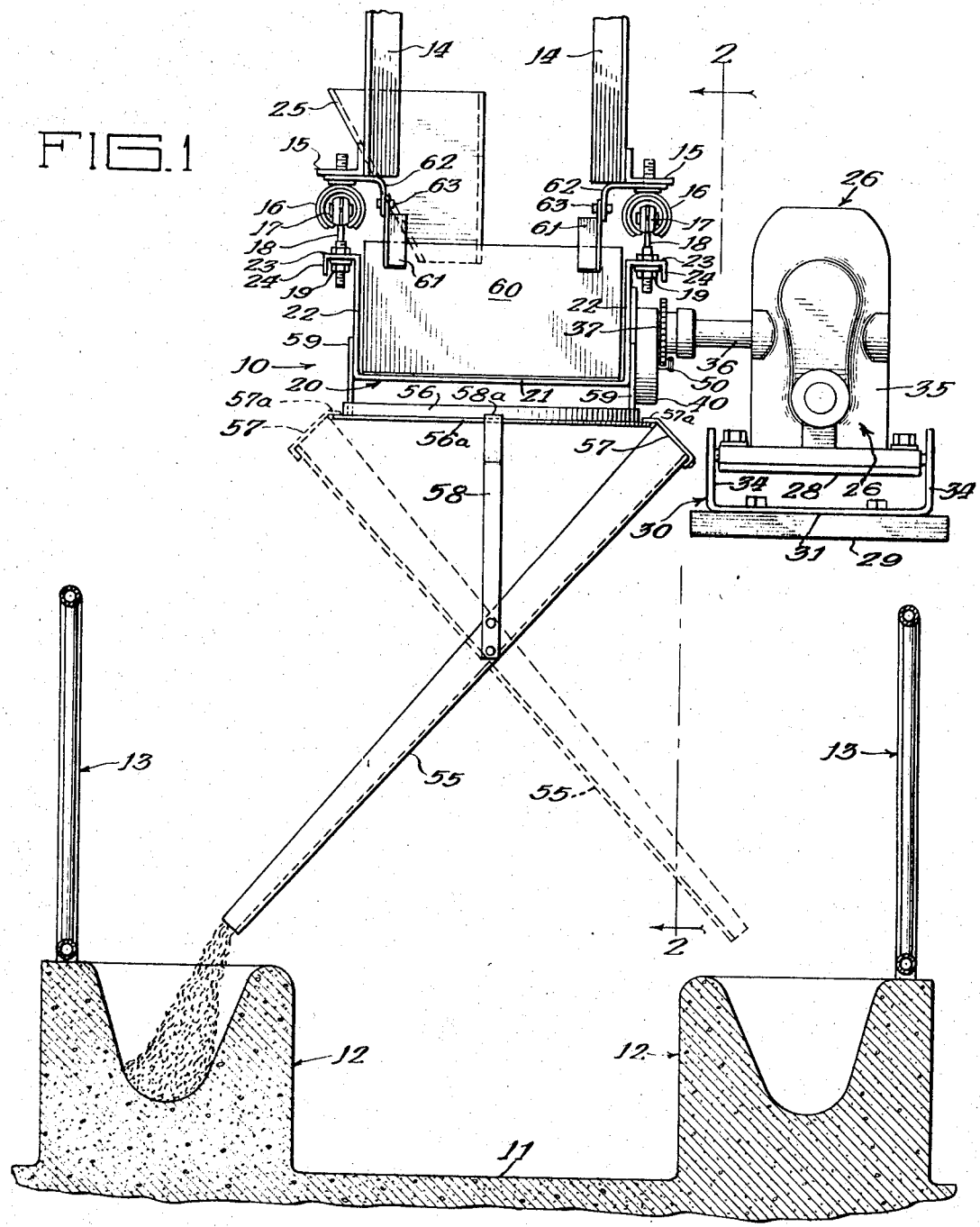

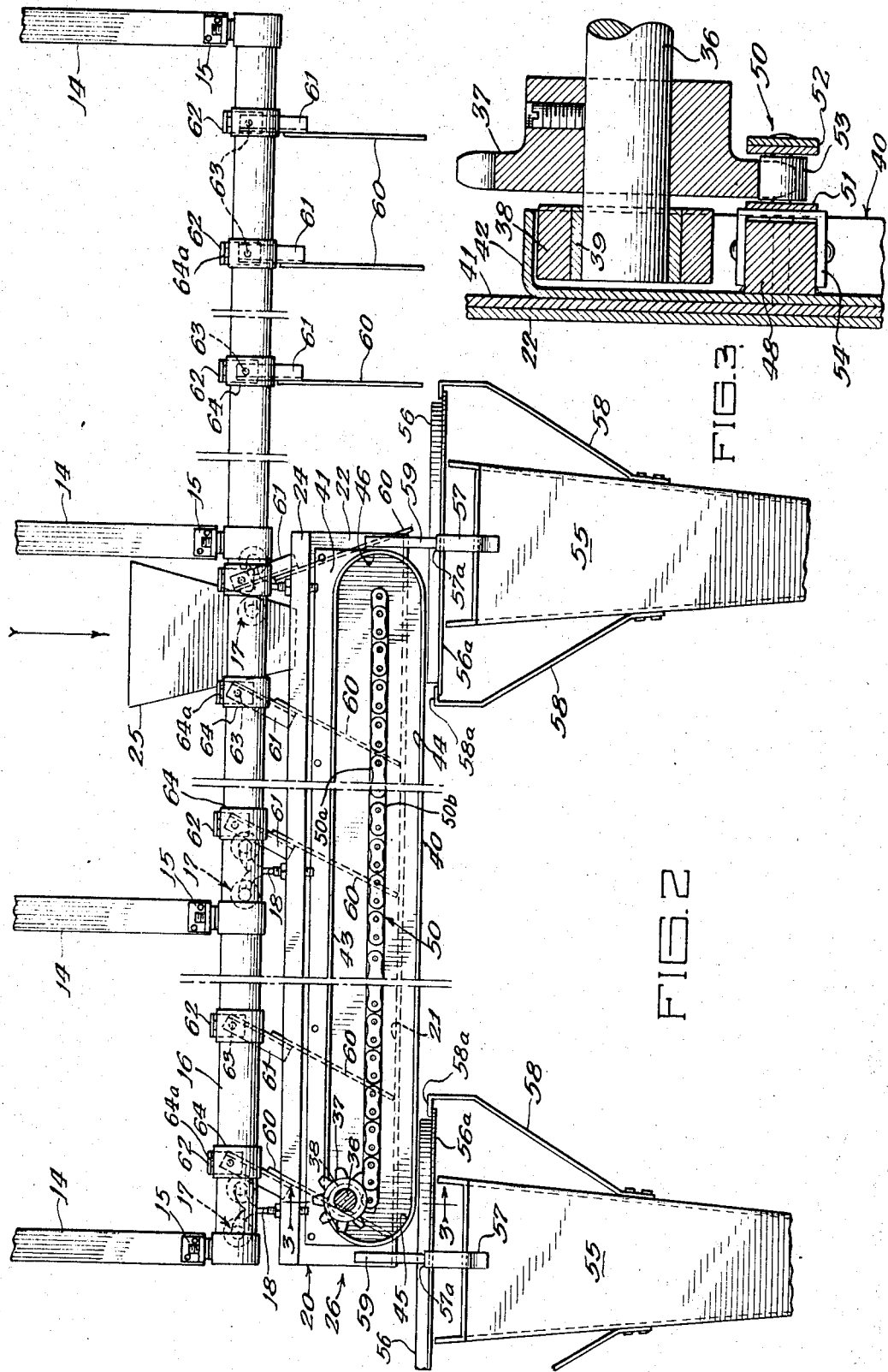

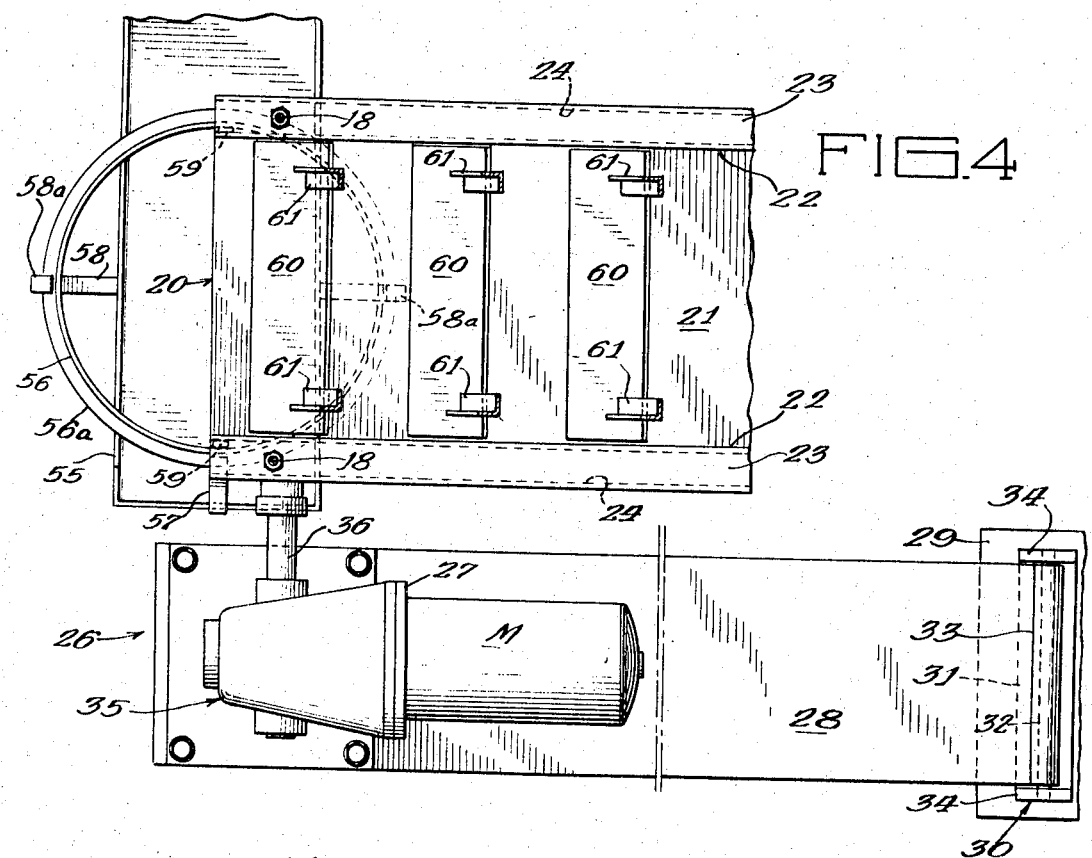
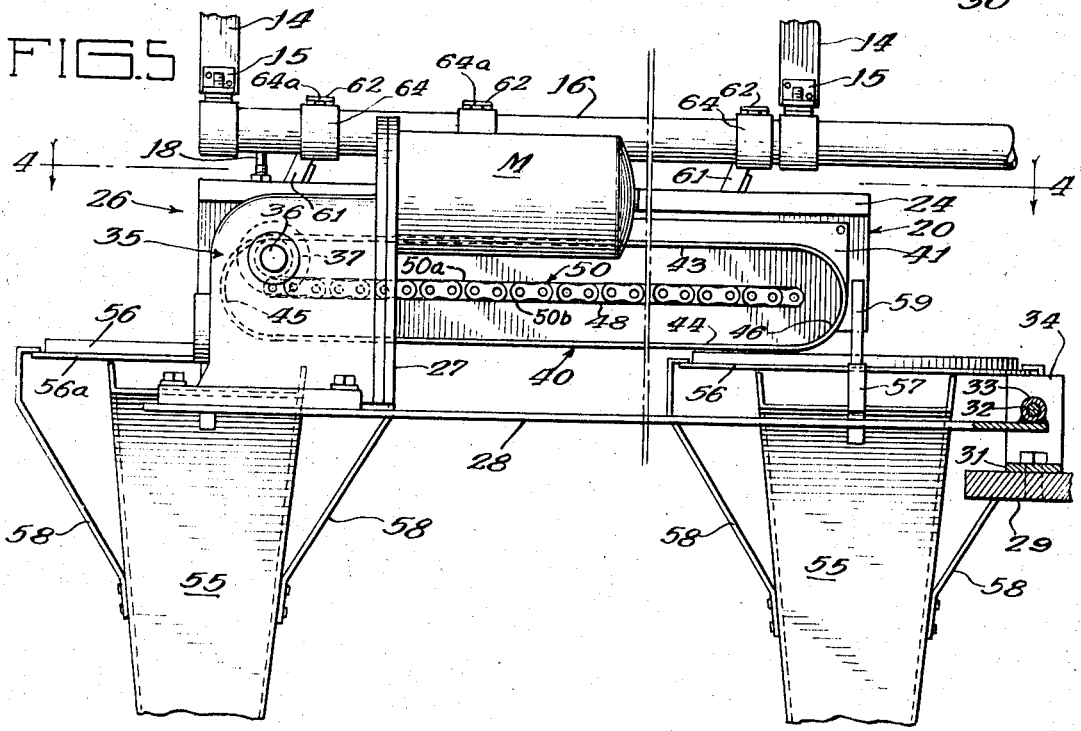

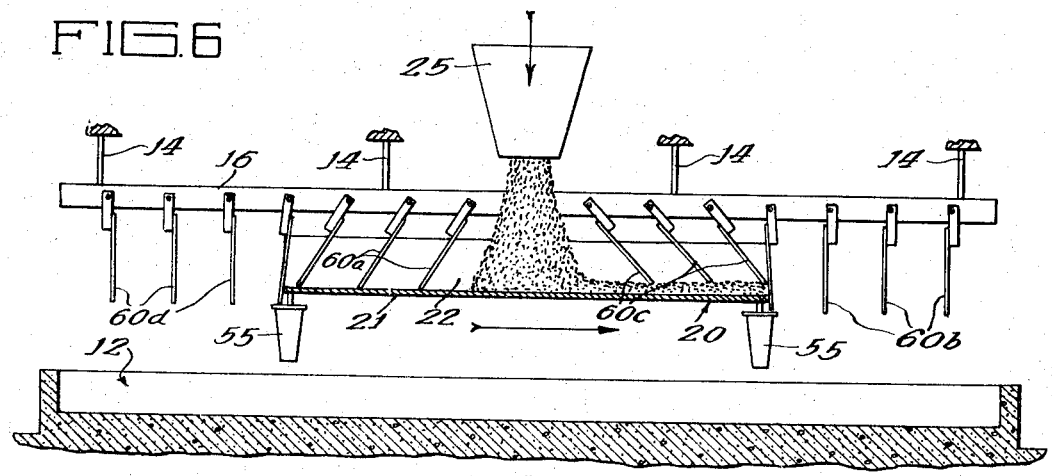
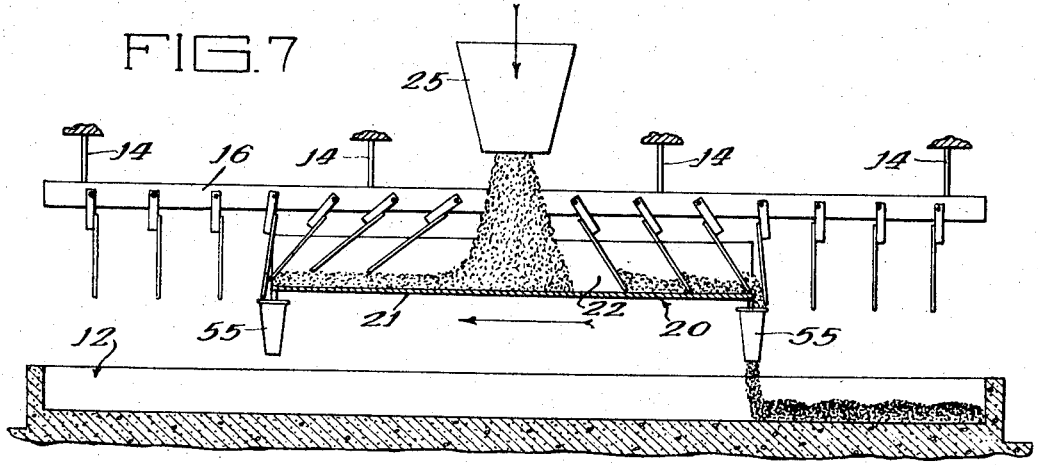
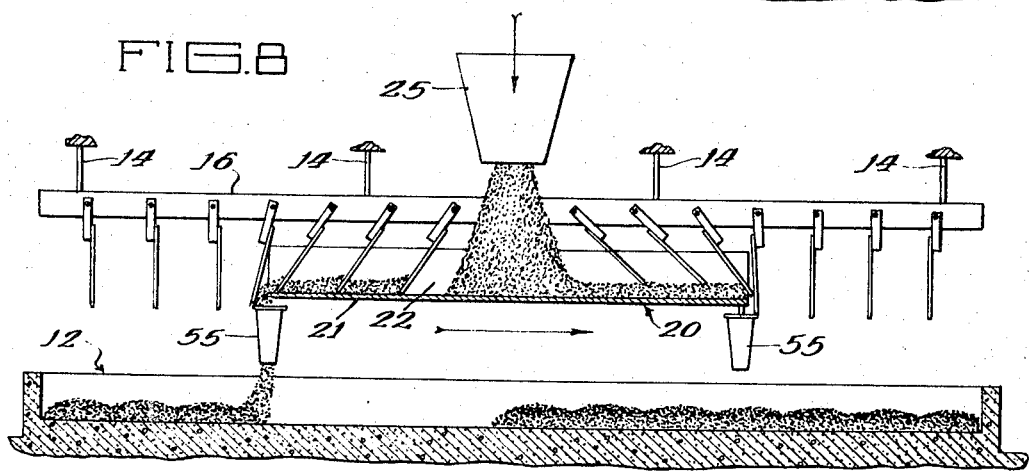

3,443,547
SHUTTLE TYPE ANIMAL FEEDER
Robert G. Ferris, Harvard, and Allen K. Gillette, Belvidere, Ill., assignors to Starline, Inc., a corporation of Delaware
Filed Nov. 4, 1966, Ser. No. 592,044
Int. Cl. A01k *5/00;* B65g *25/10*
U.S. Cl. 119—52                                             3 Claims

---

ABSTRACT OF THE DISCLOSURE

A shuttle type animal feeding apparatus including a trough that receives material thereon from a central supply source, and which is reciprocable back and forth over a plurality of animal feeding stations and beneath first and second sets of pivoted sweep members at opposite sides of the supply source which discharge material from opposite ends of the trough to the feeding stations, there being a novel drive means for reciprocating the trough.

---

This invention relates in general to shuttle type conveyors, and more particularly to shuttle type conveying and dispensing means for distributing animal feed to a plurality of animal feeding stations.

In a known type of shuttle conveyor, chains are trained around a movable table at opposite sides thereof, with the chains being fixed to a support for the table. Sprockets and a drive motor therefor are carried by the movable table, with each sprocket drivingly engaging a chain. Thus, when the motor is energized, the table will move because of the reaction force of the sprockets against the chains. A material supply source is provided centrally above the movable table, and dispensing members that extend across the table are connected between the chains, so that as the table moves, the dispensing members will scrape material off of an end of the table. Reversing means are provided for the motor so that the direction of movement of the table can be changed, whereupon material discharge will take place from the opposite end of the table. The above mentioned shuttle type of conveyor is typified by that disclosed in Fischer Patent 2,873,037, and while this structure has in general functioned satisfactorily, it does posses many inherent disadvantages. For example, there is a great deal of frictional resistance to relative movement between the chains and the table, which results in high power consumption, and wearing at the interengaging surfaces of the movable parts. Additionally, the drive system is somewhat complicated, in that it is necessary that the motor means travel with the table, and that reversing means be provided for the motor to change the direction of table movement. The general purpose of the present invention is to provide a shuttle type conveying and feeding apparatus which retains the advantageous of the structure described above, but which obviates the disadvantages and problems inherent therein.

In another known type of conveying device, a plurality of sweeps or baffles are pivotally mounted a distance less than their length above a reciprocating plate, so that when the plate is moved in one direction, the material being conveyed on the plate will freely pass under the baffles; while when the plate is moved in an opposite direction, the baffles will serve to push the material along the plate. Such conveyors have functioned satisfactorily to convey material longitudinally of a feed trough, and typical prior art arrangements are shown in Cordis Patent 2,785,791 and Reed Patent 3,024,765. Peterson Patent 2,964,126 discloses a similar type of conveyor wherein hinged scraper blades are carried by a reciprocating member that is movable relative to a stationary trough for discharging material from outlets at opposite ends of the trough. While the latter type of conveyors have functioned satisfactorily for their intended purposes, they lack the inherent advantage of a shuttle type conveyor wherein a central material source can be utilized to convey material to a movable table, which can then discharge material from the ends of the table at discharge points on opposite sides of the material source.

A principal object of the present invention is to provide a shuttle type conveyor having a central material supply station with a plurality of pivoted sweeps or baffles at opposite sides of the material supply station in operative association with a movable trough for discharging material from opposite ends of the trough at animal feeding stations.

Another object of the invention is to provide a shuttle type conveyor with improved shuttle drive means and improved material discharge means, which significantly reduce the friction between the movable parts, so as to minimize power requirements and eliminate excessive wear.

Still another object of the invention is to provide an improved motion transmitting means for a shuttle conveyor of the type described above which may be mounted at a fixed position relative to the conveyor, and is not movable with the shuttle thereof.

These and other objects of the invention with hereinafter become more fully apparent from the following description, taken in conjunction with the annexed drawings, wherein:

FIG. 1 is a cross sectional view through a feeding arrangement for a cow barn having stanchions, and illustrates a preferred embodiment of the invention in end elevation;

FIG. 2 is a broken, side elevational view taken generally along line 2—2 of FIG. 1;

FIG. 3 is an enlarged cross sectional view taken generally along line 3—3 of FIG. 2;

FIG. 4 is a fragmentary plan view, taken generally along line 4—4 of FIG. 5;

FIG. 5 is a broken, fragmentary, side elevational view of the illustrated embodiment of the invention; and FIGS. 6–8 are schematic side elevational views showing the apparatus of the present invention moving in opposite directions to receive, convey and discharge material.

While this invention is susceptible of embodiment in many different forms, there is shown in the drawings and will herein be described in detail a preferred embodiment of the invention and a modification thereof, with the understanding that the present disclosure is to be considered as an exemplification of the principles of the invention and is not intended to limit the invention to the embodiment illustrated..

Referring now to the drawings, wherein like reference characters designate like or corresponding parts throughout the several views, the illustrated embodiment of the feeding device is shown in connection with a stanchion type cow barn, but it may also be used outdoors to distribute feed into a feed bunk. In FIG. 1 the feed distributing device of the present invention is shown generally at 10 and is positioned above the floor 11 of a barn substantially on the longitudinal median plane between spaced feeding mangers 12 that extend continuously in front of stalls which are defined by bars 13 and provided with the usual stanchions (not shown) to confine the cows.

Feed distributing device 10 is suspended from a pair of spaced rows of channel shaped hanger members 14 that are secured to suitable support structure, not shown. L-shaped brackets 15 are secure adjacent the lower end of each hanger member 14 in alignment with one another, with a downwardly open split tubular track member 16 secured to each row of aligned brackets 15. A plurality of carriage assemblies 17 are mounted for longitudinal movement within each track 16, and support bolts 18 extend downwardly from each carriage 17.

A trough or pan 20 is secured to bolts 18 by nuts 19, and as best seen in FIG. 1, trough 20 is an open ended, generally U-shaped member that includes a bottom wall 21, upwardly extending vertically disposed side walls 22, outwardly extending horizontally disposed flanges 23 at the upper ends of side walls 22, and downwardly extending flanges 24 at the outer ends of flanges 23. Bolts 18 impale openings in trough flanges 23, and nuts 19 bear against opposite sides of the flanges 23, so that the trough 20 can be positively secured at vertically adjusted positions relative to the support structure.

Trough 20 is slightly longer than one-half the length of manger 12, and drive means 26 is provided for reciprocating trough 20 back and forth beneath a material supply source in the form of a hopper 25 which is positioned generally midway between the ends of the tracks 16 on support means (not shown) and which is adapted to receive material from a silo unloader, conveyor or the like. The material input from hopper 25 to trough 20 is continuous and preferably at a constant rate.

The trough drive means 26 includes a motor M (FIGS. 4 and 5) carried by a bracket 27 mounted on a support plate 28. The right-hand end of support plate 28, as viewed in FIGS. 4 and 5, is pivotally secured to a fixed frame member 29; and for this purpose, the bight portion 31 of a generally U-shaped bracket 30 is bolted or otherwise suitably secured to frame member 29, and a tubular member 33 that is welded or otherwise suitably secured to the end of plate 28 receives a pivot pin 32 therethrough that is journalled in the upstanding sides 34 of bracket 30. A right angle gear reducer 35 is bolted to the end of plate 28 remote from the pivotal connection of the latter to member 29, and motor M drives the gear reducer to turn the gear reducer output shaft 36. As best seen in FIG. 3, a sprocket 37 is mounted on shaft 36 inwardly of the outer end thereof, and a cam roller 38 is rotatably supported on shaft 36 outwardly of sprocket 37 by a bearing 39. A cam track 40 is fixed to a plate 41 that is secured to the side wall 22 of trough 20; and track 40 includes a continuous closed oval peripheral wall 42 having spaced, parallel top and bottom portions 43 and 44, respectively, and rounded opposite end portions 45 and 46, respectively. An elongate rib 48 (FIG. 3) is provided within guide track 40 on the longitudinal median plane thereof, and a length of chain 50, including spaced links 51 and 52 and rollers 53 therebetween, is secured to rib 48 by U-shaped support clevises 54. The teeth on sprocket 37 mesh with the chain 50, so that when the motor M is energized, the reaction force of the sprocket teeth on the chain will cause the trough 20 to move longitudinally, while the cam roller 38 proceeds around the peripheral wall 42 of the guide track 40. Motor support plate 28 pivots as the guide roller 38 passes around the rounded track portions 45 and 46 to reverse the direction of movement of trough 20 by causing the sprocket 37 to engage the top face 50a of the chain to drive the trough in one direction and the bottom face 50b of the chain to drive the trough in the opposite direction. From the foregoing it will be appreciated that the drive means 26 functions to impart reciprocatory movement to the trough 20 although motor M rotates always in one direction.

Identical feed distributing means is provided at each end of the trough 20, and each said means includes a discharge chute 55 that is generally U-shaped in cross section, and which is rotatably mounted upon a circular support member 56 that is L-shaped in cross section and suspended by brackets 59 secured to the side walls 22 of the trough. Discharge chutes 55 have arms 57 and 58 at their upper ends which are provided with inturned fingers 57a and 58a that overlie and are slidably supported on the generally horizontally disposed flange 56a of member 56, so that the chutes 55 may be rotated from the full line position to the broken line position of FIG. 1 to selectively discharge into one or the other of feed mangers 12. While discharge chutes have been illustrated and described, it will be appreciated that they are not always required; as for example when feed is being distributed into a single manger, the trough 20 may be positioned directly above the manger and the feed discharged from the trough ends. In outside installations, where the feed is being distributed into a feed bunk, the pivotally mounted discharge chutes can be replaced by a deflector or downspout to prevent wind from blowing feed out of the bunk.

Means is provided for discharging material from the ends of trough 20, and said discharge means includes a plurality of baffle-like sweep members 60 that are spaced substantially equally along guide tracks 16 generally opposite the bars 13 that separate the cow stalls from one another. Arms 61 are fixed to opposite sides of sweeps 60 and extend upwardly so as to be pivotally secured to L-shaped brackets 62 by pivot pins 63. Brackets 62 are carried by sleeves 64 that are adjustably mounted on tracks 16, and sleeves 64 may be fixed at desired locations on tracks 16 by a set screw 64. As is clear from FIG. 2, the distance between the plane of pivot pins 63 and the free ends of sweeps 60 is greater than the distance between the plane of pivot pins 63 and the bottom 21 of trough 20. Thus, the sweeps 60 that are positioned immediately above trough 20 will engage the bottom of the trough and assume an inclined position with respect thereto. Sweeps 60 are preferably coated with a material having a low coefficient of friction, such as Teflon, to minimize wear between the sweeps and the trough.

The operation of the above described structure will be best understood from a consideration of FIGS. 6–8. Assuming that the trough 20 is initially at the left-hand end of the row of sweeps 60, with the right-hand end of the trough being disposed under the material supply hopper 25, the sweeps on the left-hand side of the hopper 25 will each be in engagement with the bottom surface 21 of the trough 20 and thus inclined as shown at 60a; while the sweeps on the right-hand side of hopper 25 will hang vertically downwardly as shown at 60b. When the motor M is energized to actuate the drive means 26, the trough 20 will move to the right toward the position of FIG. 6, and the sweeps on the right-hand side of hopper 25 will ride upwardly upon the material being continuously discharged onto the trough and assume an inclined position such as shown at 60c in FIG. 6. When the trough 60 reaches the right-hand end of its stroke, material will be distributed evenly throughout the length of the trough, and each of the sweeps on the right-hand side of the hopper 25 will be inclined as shown at 60c, while each of the sweeps on the left-hand side of the hopper 25 will hang freely vertically downwardly as shown at 60d. As the trough 20 begins its movement from the extreme right-hand position toward the position of FIG. 7, the endmost sweep on the right-hand side of hopper 25 will slide downwardly into the material within trough 20 and scrape the same off the end of the trough into the discharge chute 55 as the trough 20 continues its movement to the left. As the movement of the chute 20 proceeds past the position of FIG. 7 to the left-hand end of its stroke, each of the sweeps on the right hand side of the hopper 25 will discharge a measured amount of material from the end of the trough, while the sweeps on the left-hand side of the hopper 25 will ride upwardly upon the material being discharged onto the trough as it moves under the hopper 25. When the trough 20 moves from its left-hand position toward the position of FIG. 8, the sweeps 60 on the left-hand side of hopper 25 will each discharge a measured amount of material from the end of the trough 20 into chute 55, while the sweeps 60 on the right-hand side of hopper 25 ride upwardly upon the material distributed in the trough 20. The above cycle is repeated until the desired amount of material has been distributed. Multiple cycles serve to average any irregularities in the input rate from the hopper 25. It will be appreciated that the sweeps 60 each function to distribute material from the trough at a separate animal feeding station in the feed manger, and the sweeps 60 may be adjusted by moving the sleeves 64 so that the feed will drop in front of each stanchioned animal.

We claim:

1. In a shuttle type feeder of the type which includes a frame, a material supply station associated with said frame, a row of sweep members pivotally suspended from the frame, there being a first set of said members to one side of the supply station and a second set to the other side thereof, a trough supported on said frame and adapted to receive material from the supply station, said trough having a length approximately one-half the combined effective length of the first and second sets of sweep members and having means to discharge material at opposite ends thereof into a feed manger, means for preventing effective pivotal movement of said sweep members toward said supply source, drive means for reciprocating said trough between a first position beneath the first set of sweep members and a second position beneath the second set of sweep members as it receives material from the supply station, whereby on each reciprocation of the trough the sweeps in the set toward which the trough is moving are pivoted by the material in the trough, while the sweeps in the other set are prevented from effective pivotal movement to push material off the trailing end of the trough, said drive means comprising, in combination: a support plate pivotally mounted on the frame; a drive motor carried by said support plate at a fixed position on the frame; a driving member driven by said motor; cam follower means on said driving member; cam means mounted on the trough; and a driven member adjacent said cam means and engaging said driving member, said cam means engaging said cam follower means to guide said driven member in a path of movement in which it is constantly engaged by the driving member.

2. The combination of claim 1 in which the cam means comprises a closed oval track which has a long dimension extending longitudinally of the trough, a short dimension which is more than twice the diameter of the cam follower so said track may move over the cam follower, and arcuate ends, in which the driven member is on the longitudinal median plane of the track and has top and bottom faces, and in which the support plate pivot is normal to a plane along an edge of the track, so the motor can move up and down as the cam follower traverses the ends of the track, whereby movement of the track over the cam follower causes the driven member to move with its top face in contact with the driving member as the cam moves in one direction and with its bottom face in contact with the driving member as the cam moves in the other direction.

3. The combination of claim 2 in which the driving member is a sprocket and the driven member is a length of roller chain.

References Cited

UNITED STATES PATENTS

| | | | |
|---|---|---|---|
| 1,771,778 | 7/1930 | Davis | 198—1 |
| 2,050,477 | 8/1936 | Weisselberg | 34—164 |
| 2,342,039 | 2/1944 | Davis | 198—66 |
| 2,720,384 | 10/1955 | Gaenzle | 198—66 X |
| 3,024,765 | 3/1962 | Reed | 198—224 X |
| 3,134,478 | 5/1964 | Haen et al. | 119—52 X |
| 3,252,444 | 5/1966 | Haen | 119—52 |
| 3,342,165 | 9/1967 | Szymanski | 119—56 |
| 3,360,108 | 12/1967 | Voss | 198—213 |
| 3,366,223 | 1/1968 | Haen | 119—56 X |

ALDRICH F. MEDBERY, *Primary Examiner.*

U.S. Cl. X.R.

198—67, 224